(12) United States Patent
Sekar et al.

(10) Patent No.: US 11,308,145 B2
(45) Date of Patent: Apr. 19, 2022

(54) SYSTEM AND METHOD FOR MULTIMEDIA CONTACT CENTER INTERACTIONS VIA AN AUDIOVISUAL ASYNCHRONOUS CHANNEL

(71) Applicant: Genesys Telecommunications Laboratories, Inc., Daly City, CA (US)

(72) Inventors: Archana Sekar, Chennai (IN); Ravikumar Gopal, Chennai (IN); Padmapriya Murali, Chennai (IN); Vidhyasimhan Jayaraghavendran, Chennai (IN)

(*) Notice: Subject to any disclaimer, the term of this patent is extended or adjusted under 35 U.S.C. 154(b) by 364 days.

(21) Appl. No.: 16/420,258

(22) Filed: May 23, 2019

(65) Prior Publication Data

US 2020/0372063 A1    Nov. 26, 2020

(51) Int. Cl.
*G06F 16/00* (2019.01)
*G06F 16/438* (2019.01)
*G06F 16/432* (2019.01)

(52) U.S. Cl.
CPC .......... *G06F 16/438* (2019.01); *G06F 16/433* (2019.01); *G06F 16/434* (2019.01)

(58) Field of Classification Search
CPC . G06Q 10/06311; G06F 16/438; G06F 16/44; G06F 16/433; G06F 16/434; G06K 2009/00738
See application file for complete search history.

(56) References Cited

U.S. PATENT DOCUMENTS

| | | | |
|---|---|---|---|
| 6,230,197 B1 | 5/2001 | Beck et al. | |
| 6,567,813 B1* | 5/2003 | Zhu | G06Q 10/10 707/802 |
| 7,945,621 B2* | 5/2011 | Yuan | H04L 67/22 709/204 |
| 8,243,119 B2* | 8/2012 | Thapa | H04L 65/1093 348/14.08 |
| 2006/0248144 A1* | 11/2006 | Zhu | H04L 12/1827 709/205 |
| 2012/0066175 A1* | 3/2012 | Pickering | H04M 3/5191 707/609 |
| 2014/0250227 A1* | 9/2014 | Slovacek | H04M 3/5191 709/224 |

(Continued)

OTHER PUBLICATIONS

Zoom, "Zoom Rooms User Guide", Feb. 2018, Support.Zoom.US, pp. 1-6. (Year: 2018).*

(Continued)

*Primary Examiner* — Cheryl Lewis

(57) ABSTRACT

A system and method for multimedia contact center interactions via an audiovisual asynchronous messaging channel is provided. In an embodiment, an organization might operate a website comprising information and for providing an entry point of communication with a contact center. A communications channel may be integrated directly with the organization's website, which includes an editable audiovisual interface. A user may interact with the editable interface through a variety of means, including sketching on a webpage and recording to create a video form of audiovisual asynchronous query over the web page. The interaction is analyzed and routed to an agent for handling. The agent may then be connected to the user through the asynchronous channel.

16 Claims, 10 Drawing Sheets

(56) References Cited

U.S. PATENT DOCUMENTS

| | | | |
|---|---|---|---|
| 2015/0120786 A1* | 4/2015 | Slovacek | G06F 16/285 |
| | | | 707/803 |
| 2015/0201077 A1 | 7/2015 | Konig et al. | |
| 2018/0220002 A1 | 8/2018 | Wu et al. | |
| 2019/0037077 A1 | 1/2019 | Konig et al. | |
| 2020/0304644 A1* | 9/2020 | Jia | H04M 3/002 |
| 2020/0304757 A1* | 9/2020 | Jiang | H04N 7/152 |

OTHER PUBLICATIONS

Naphade et al., "Audio-Visual Query and Retrieval: A System That Uses Dynamic Programming and Relevance Feedback," Journal of Electronic Imaging 10(4), pp. 861-870, Oct. 2001. (Year: 2001).*
PCT International Search Report and Written Opinion regarding co-pending application No. PCT/US2020/033904 dated Jul. 23, 2020.

* cited by examiner

400

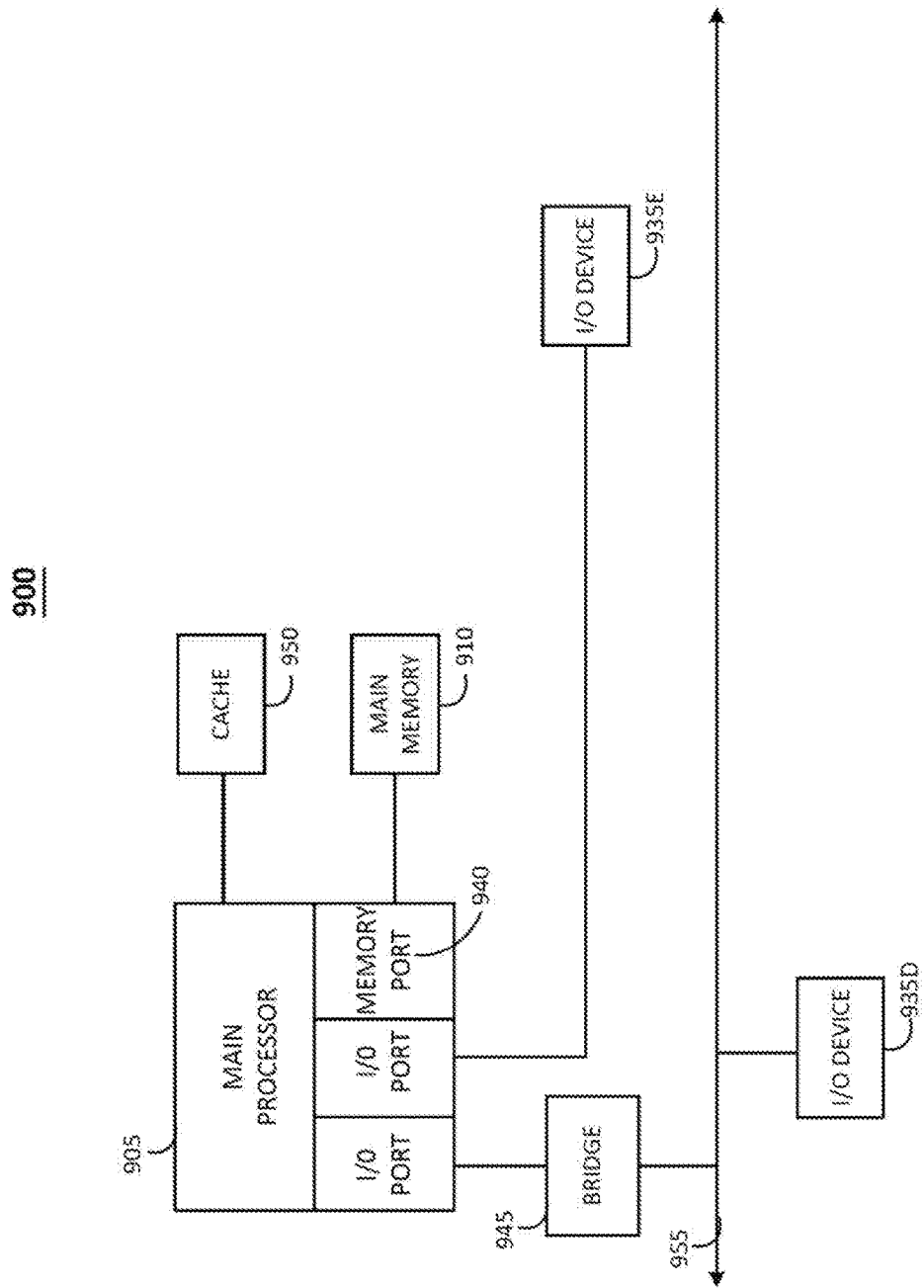

SYSTEM AND METHOD FOR MULTIMEDIA CONTACT CENTER INTERACTIONS VIA AN AUDIOVISUAL ASYNCHRONOUS CHANNEL

BACKGROUND

The present invention generally relates to telecommunications systems and methods, as well as the integration of communication means within websites. More particularly, the present invention pertains to the engagement of customers through websites.

SUMMARY

A system and method for multimedia contact center interactions via an audiovisual asynchronous messaging channel is provided. In an embodiment, an organization might operate a website comprising information and for providing an entry point of communication with a contact center. A communications channel may be integrated directly with the organization's website, which includes an editable audiovisual interface. A user may interact with the editable interface through a variety of means, including sketching on a webpage and recording to create a video form of audiovisual asynchronous query over the web page. The interaction is analyzed and routed to an agent for handling. The agent may then be connected to the user through the asynchronous channel.

In an embodiment, a method is provided for transmitting an interactive audiovisual asynchronous query in a contact center system, the method comprising: providing, by a web server, an editable audiovisual interface to a web-enabled user device associated with a first party; recording, by the web server, an interaction of the first party with the editable audiovisual interface; generating, by the web server, an asynchronous query for the contact center system from the recorded interaction; processing, by an audiovisual analysis system, at least one of the audio and the video of the asynchronous query; determining, by the audiovisual analysis system, an intent generated from the processed video; transmitting, by the audiovisual analysis system, the determined intent and the asynchronous query to a routing server; and transmitting, by the routing server, a signal for routing the asynchronous query to a second party wherein the determined intent is used to determine the second party recipient of the asynchronous query.

The editable audiovisual interface comprises tools to enable the first party to perform over a web page of the user device one or more of: draw, point, write text, and input speech.

The processing further comprises determining an action performed during the asynchronous query by the first party. The processing may also further comprise determining an object engaged on a web page of the user device during the asynchronous query. The processing may also further comprise determining portions of audio needing stitched to corresponding video of the asynchronous query.

The second party may be a virtual agent. The second party may also respond to the recorded interaction though the editable audiovisual interface.

The intent comprises routing parameters, wherein the routing parameters comprise at least one of: customer type, webpage type, intent type, user intent, keyword, mood, priority, and emotion.

The responding comprises: providing, by a web server, an editable audiovisual interface to the second party; recording, by the web server, the second party interaction with the editable audiovisual interface; recording, by the audiovisual analysis system, the second party interaction for preservation by the contact center; and transmitting, by the audiovisual analysis system, the second party interaction to the first party through the asynchronous channel.

The determining of intent comprises: determining, by the audiovisual analysis system, frames in the asynchronous query indicating an action performed by the first party in video of the query; generating, by the audiovisual analysis system, a plurality of audiovisual clips from the query, dividing the query from the determined frames indicating action performed by the first party; processing, by the audiovisual analysis system, one of the generated audiovisual clips, wherein the processing comprises using an action recognition application for determining an action performed during the generated audiovisual clip; processing, by the audiovisual analysis system, the generated audiovisual clip through an entity recognition application for determining an interacted entity during the generated audiovisual clip; processing, by the audiovisual analysis system, the audio of the query that requires stitching to corresponding action identified from audiovisual clips; processing, by the audiovisual analysis system, the generated audiovisual clip through a speech recognition application for deriving content of speech from the generated audiovisual clip; generating, by the audiovisual analysis system, an audiovisual clip output comprised of determined action, interacted entity, and derived speech content from the processed generated audiovisual clip; and determining, by the audiovisual analysis system, a first party intent from the generated audiovisual clip output.

The action performed during the generated audiovisual clip is a drawing by the first party in the video of the query. The action performed during the generated audiovisual clip is a typed text by the first party in the video of the query.

The interacted entity is a web browser object in a web browser window.

Responding comprises an asynchronous automated response. The responding may further comprise the steps of: providing, by a web server, an editable audiovisual interface to the first party; providing, by the web server, an interaction point for the first party; providing, by the web server, a recommendation window in response to the first party interacting with the interaction point; receiving, by the web server, a signal indicating a selection by the first party from the recommendation window; determining, by a recommendation engine, whether an asynchronous automated response exists for the selection by the first party from the recommendation window; and transmitting, by the web server, to the end user the asynchronous automated response if the asynchronous automated response exists for the selection by the end user from the recommendation window, otherwise, routing the interaction to a second party for handling.

The interaction point is associated with a web browser object shown on the web-enabled end user device. The recommendation engine generates the selection from the recommendation window from a database of intents and entity classification generated from other queries.

BRIEF DESCRIPTION OF THE DRAWINGS

FIG. 9B is a diagram illustrating an embodiment of a computing device.

DETAILED DESCRIPTION

Figure 1:
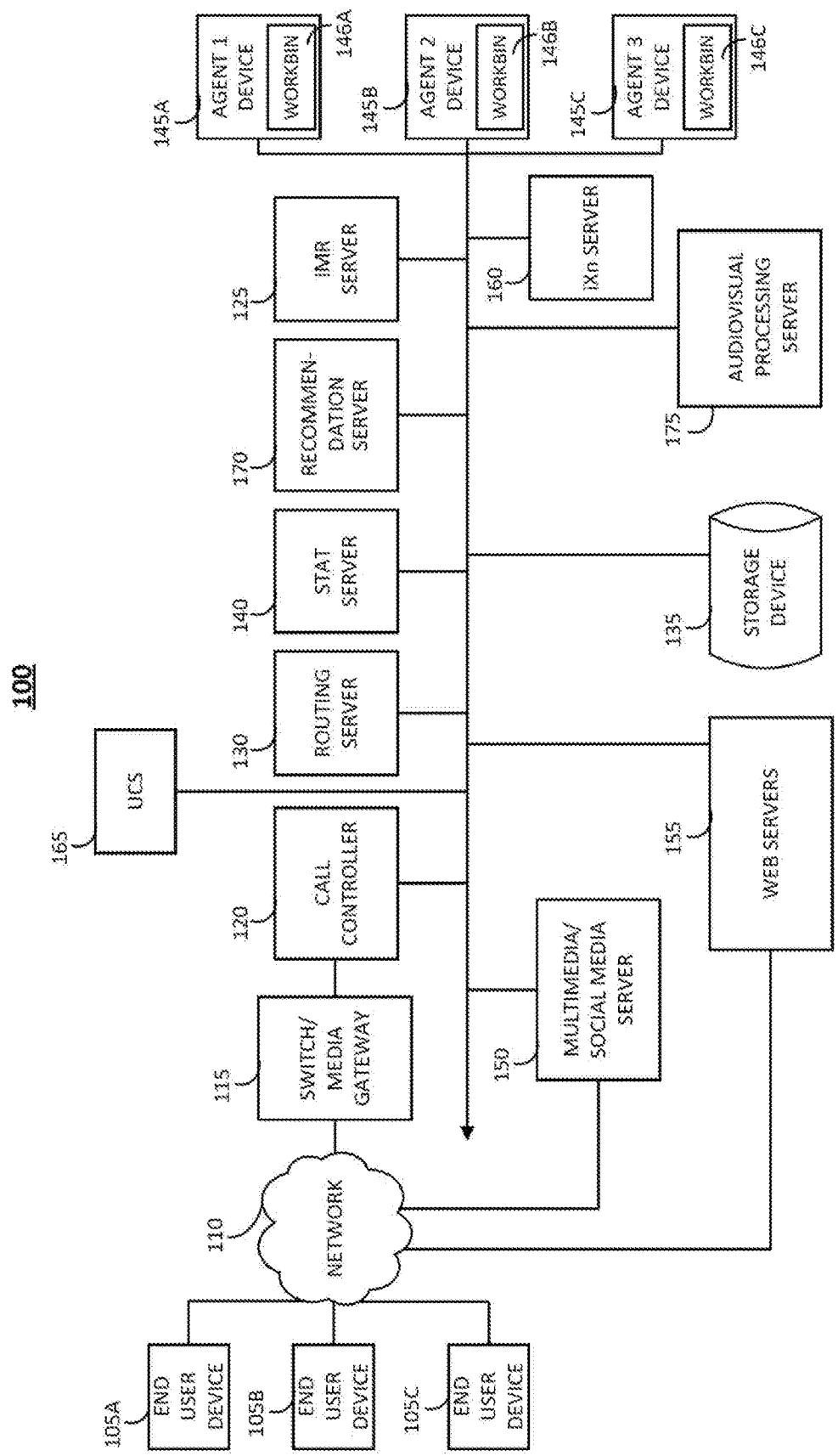
FIG. 1 is a diagram illustrating an embodiment of a contact center system.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The inclusion of audiovisual mediums to enable communication between a customer and a business enterprise allows the enterprise to communicate the brand story, explain value proposition, and build relationships between customers and products. Generally, business enterprises have predominately used audiovisual technology for effective marketing, to increase sales, and for showcasing their brand identity. However, an enterprise can deploy audiovisual technology in other channels as well. In a contact center, for example, dynamically created audiovisual media coupled with image recognition and artificial intelligence can be used as an effective and productive self-service channel. The creation of audiovisual media by end users (i.e. customers) of the contact center can assist agents in providing accurate solutions to the end user and seek to increase the first call resolution rate.

The creation of a new self-service channel in a contact center that permits the users to generate audiovisual media, can allow resolution of some of the problems faced by customers using a contact center. Numerous examples exist of current "gaps" in a contact center that inhibit the ability of a customer to obtain desired information from the contact center that would resolve the customer's problem. For example, if a customer is making an online purchase during non-business hours and needs clarification regarding ordering, the customer may not want to wait until the next business day to have the order clarified. In another example, a customer may find that it is difficult to express the problems they are facing with the business through email. This may particularly be the case if the customer believes the email will take a long time to generate and be answered by the business. In another example, the customer may have a strong preference against wanting to traverse a contact center's Interactive Voice Response (IVR) system and wait to interact with a skilled agent. In yet another example, the user may want immediate service during peak time when all the agents are busy.

The present disclosure describes embodiments of an editable interface with an asynchronous audiovisual channel, which customers can use to narrate their query with sketching and recording tools. Such gestures are captured in sync, through video, for example, with the accompanying audio, for playback. In an embodiment, the user interactions will be recorded as a single compressed video and sent to the contact center. These videos can be analyzed and meaningful information can be extracted for purposes such as providing accurate solution(s) to customer and selecting the most appropriate agent for handling.

Contact Center Systems

FIG. 1 is a diagram illustrating an embodiment of a contact center system, indicated generally at 100. For example, FIG. 1 illustrates a system for supporting a contact center in providing contact center services. The contact center may be an in-house facility to a business or enterprise for serving the enterprise in performing the functions of sales and service relative to the products and services available through the enterprise. In another aspect, the contact center may be operated by a third-party service provider. In an embodiment, the contact center may operate as a hybrid system in which some components of the contact center system are hosted at the contact center premises and other components are hosted remotely (e.g., in a cloud-based environment). The contact center may be deployed on equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

Components of the communication infrastructure indicated generally at 100 include: a plurality of end user devices 105A, 105B, 105C; a communications network 110; a switch/media gateway 115; a call controller 120; an IMR server 125; a routing server 130; a storage device 135; a statistics server 140; a plurality of agent devices 145A, 145B, 145C comprising workbins 146A, 146B, 146C; a multimedia/social media server 150; web servers 155; an iXn server 160; a UCS 165; a recommendation server 170; and an audiovisual processing server 175.

In an embodiment, the contact center system manages resources (e.g., personnel, computers, telecommunication equipment, etc.) to enable delivery of services via telephone or other communication mechanisms. Such services may vary depending on the type of contact center and may range from customer service to help desk, emergency response, telemarketing, order taking, etc.

Customers, potential customers, or other users (collectively referred to as customers or end users) desiring to receive services from the contact center may initiate inbound communications (e.g., telephony calls, emails, chats, etc.) to the contact center via end user devices 105A, 105B, and 105C (collectively referenced as 105). Each of the end user devices 105 may be a communication device conventional in the art, such as a telephone, wireless phone, smart phone, personal computer, electronic tablet, laptop, etc., to name some non-limiting examples. Users operating the end user devices 105 may initiate, manage, and respond to telephone calls, emails, chats, text messages, web-browsing sessions, and other multi-media transactions. While three end user devices 105 are illustrated at 100 for simplicity, any number may be present.

Inbound and outbound communications from and to the end user devices 105 may traverse a network 110 depending on the type of device that is being used. The network 110 may comprise a communication network of telephone, cellular, and/or data services and may also comprise a Private or Public Switched Telephone Network (PSTN), Local Area Network (LAN), Private Wide Area Network (WAN), and/or Public WAN such as the Internet, to name a non-limiting example. The network 110 may also include a wireless carrier network including a Code Division Multiple Access (CDMA) network, Global System for Mobile communications (GSM) network, or any wireless network/technology conventional in the art, including but not limited to 3G, 4G, LTE, etc.

In an embodiment, the contact center system includes a switch/media gateway 115 coupled to the network 110 for receiving and transmitting telephony calls between the end users and the contact center. The switch/media gateway 115 may include a telephony switch or communication switch configured to function as a central switch for agent level routing within the center. The switch may be a hardware switching system or a soft switch implemented via software. For example, the switch 115 may include an automatic call distributor, a Private Branch Exchange (PBX), an IP-based software switch, and/or any other switch with specialized hardware and software configured to receive Internet-sourced interactions and/or telephone network-sourced interactions from a customer, and route those interactions to, for example, an agent telephony or communication device. In this example, the switch/media gateway establishes a voice path/connection (not shown) between the calling customer and the agent telephony device, by establishing, for example, a connection between the customer's telephony device and the agent telephony device.

In an embodiment, the switch is coupled to a call controller 120 which may, for example, serve as an adapter or interface between the switch and the remainder of the routing, monitoring, and other communication-handling components of the contact center. The call controller 120 may be configured to process PSTN calls, VoIP calls, etc. For example, the call controller 120 may be configured with Computer-Telephony Integration (CTI) software for interfacing with the switch/media gateway and contact center equipment. In an embodiment, the call controller 120 may include a Session Initiation Protocol (SIP) server for processing SIP calls. The call controller 120 may also extract data about the customer interaction, such as the caller's telephone number (e.g., the Automatic Number Identification (ANI) number), the customer's Internet Protocol (IP) address, or email address, and communicate with other components of the system 100 in processing the interaction.

In an embodiment, the system 100 further includes an Interactive Media Response (IMR) server 125. The IMR server 125 may also be referred to as a self-help system, a virtual assistant, etc. The IMR server 125 may be similar to an Interactive Voice Response (IVR) server, except that the IMR server 125 is not restricted to voice and additionally may cover a variety of media channels. In an example illustrating voice, the IMR server 125 may be configured with an IMR script for querying customers on their needs. For example, a contact center for a bank may tell customers via the IMR script to 'press 1' if they wish to retrieve their account balance. Through continued interaction with the IMR server 125, customers may be able to complete service without needing to speak with an agent. The IMR server 125 may also ask an open-ended question such as, "How can I help you?" and the customer may speak or otherwise enter a reason for contacting the contact center. The customer's response may be used by a routing server 130 to route the call or communication to an appropriate contact center resource.

If the communication is to be routed to an agent, the call controller 120 interacts with the routing server (also referred to as an orchestration server) 130 to find an appropriate agent for processing the interaction. The selection of an appropriate agent for routing an inbound interaction may be based, for example, on a routing strategy employed by the routing server 130, and further based on information about agent availability, skills, and other routing parameters provided, for example, by a statistics server 140.

In an embodiment, the routing server 130 may query a customer database, which stores information about existing clients, such as contact information, Service Level Agreement (SLA) requirements, nature of previous customer contacts and actions taken by the contact center to resolve any customer issues, etc. The database may be, for example, Cassandra or any NoSQL database, and may be stored in a mass storage device 135. The database may also be a SQL database and may be managed by any database management system such as, for example, Oracle, IBM DB2, Microsoft SQL server, Microsoft Access, PostgreSQL, etc., to name a few non-limiting examples. The routing server 130 may query the customer information from the customer database via an ANI or any other information collected by the IMR server 125.

Once an appropriate agent is identified as being available to handle a communication, a connection may be made between the customer and an agent device 145A, 145B and/or 145C (collectively referenced as 145) of the identified agent. While three agent devices are illustrated in FIG. 1 for simplicity, any number of devices may be present. Collected information about the customer and/or the customer's historical information may also be provided to the agent device for aiding the agent in better servicing the communication. In this regard, each agent device 145 may include a telephone adapted for regular telephone calls, VoIP calls, etc. The agent device 145 may also include a computer for communicating with one or more servers of the contact center and performing data processing associated with contact center operations, and for interfacing with customers via voice and other multimedia communication mechanisms.

The contact center system 100 may also include a multimedia/social media server 150 for engaging in media interactions other than voice interactions with the end user devices 105 and/or web servers 155. The media interactions may be related, for example, to email, vmail (voice mail through email), chat, video, text-messaging, web, social media, co-browsing, etc. The multi-media/social media server 150 may take the form of any IP router conventional in the art with specialized hardware and software for receiving, processing, and forwarding multi-media events.

The web servers 155 may include, for example, social interaction site hosts for a variety of known social interaction sites to which an end user may subscribe, such as Facebook, Twitter, Instagram, etc., to name a few non-limiting examples. In an embodiment, although web servers 155 are depicted as part of the contact center system 100, the web servers may also be provided by third parties and/or maintained outside of the contact center premise. The web servers 155 may also provide web pages for the enterprise that is being supported by the contact center system 100. End users may browse the web pages and get information about the enterprise's products and services. The web pages may also provide a mechanism for contacting the contact center via, for example, web chat, voice call, email, Web Real-Time Communication (WebRTC), etc.

In an embodiment, deferrable interactions/activities may also be routed to the contact center agents in addition to real-time interactions. Deferrable interaction/activities may comprise back-office work or work that may be performed off-line such as responding to emails, letters, attending training, or other activities that do not entail real-time communication with a customer. An interaction (iXn) server 160 interacts with the routing server 130 for selecting an appropriate agent to handle the activity. Once assigned to an agent, an activity may be pushed to the agent, or may appear in the agent's workbin 146A, 146B, 146C (collectively 146) as a task to be completed by the agent. The agent's workbin may be implemented via any data structure conventional in the art, such as, for example, a linked list, array, etc. In an embodiment, a workbin 146 may be maintained, for example, in buffer memory of each agent device 145.

In an embodiment, the mass storage device(s) 135 may store one or more databases relating to agent data (e.g., agent profiles, schedules, etc.), customer data (e.g., customer profiles), interaction data (e.g., details of each interaction with a customer, including, but not limited to: reason for the interaction, disposition data, wait time, handle time, etc.), and the like. In another embodiment, some of the data (e.g., customer profile data) may be maintained in a Customer Relationship Management (CRM) database hosted in the mass storage device 135 or elsewhere. The mass storage device 135 may take form of a hard disk or disk array as is conventional in the art. In an embodiment, mass storage device 135 may be accessed through a number of the servers comprising the contact center 100. The contact center may be comprised of a municipality of mass storage devices 135 associated with specific servers comprising the contact center 100.

In an embodiment, the contact center system may include a universal contact server (UCS) 165, configured to retrieve information stored in the CRM database and direct information to be stored in the CRM database. The UCS 165 may also be configured to facilitate maintaining a history of customers' preferences and interaction history, and to capture and store data regarding comments from agents, customer communication history, etc.

The contact center system may also include a recommendation server 170 configured with a recommendation engine to generate self-help solutions and suggestions for an end user of the contact center system 100. The recommendation engine on recommendation server 170 may be pretrained from information gathered from existing enterprise FAQ pages and customer knowledge base. The recommendation server 170 may also dynamically map each of the sets of extracted questions and answer to a particular goods and/or service offered by the enterprise. Recommendation server may use data from mass storage device 135 including agent data, customer data, and interaction data. Recommendation server may use data from other contact center systems such as web server 155 containing information about the enterprise's goods and/or services. The recommendation server 170 may also learn user behavior based on action. For example, based on the past purchases of the user, webpage traversal, wish lists, asynchronous audio-visual query videos, etc., the system may glean information (e.g., the user's affinity for discounted products, the user's preference to a set of brands, etc.) about the user's behavior and group the user into various categories.

Figure 2:
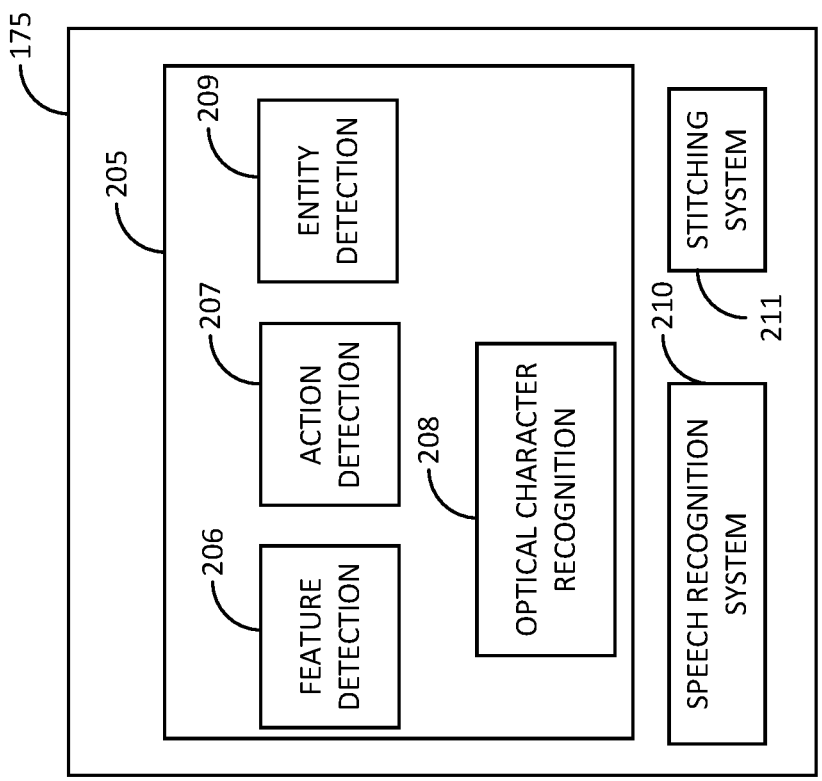
FIG. 2 is a diagram illustrating an embodiment of an audiovisual processing server.

The contact center system may also include an audiovisual processing server 175 configured to process audiovisual medium received by the contact center and convert the audiovisual medium into other data usable by the contact center. For example, the audiovisual processing server 175 may receive a video inputted to the contact center, analyze the content of the inputted video, and provide an output to the contact center consisting of text files describing certain actions that occurred during the video. In another embodiment, the output may also comprise intent gleaned from the video which is mapped to associated entities. Entities are able to be classed under broad categories so that the intent received for an entity can be generalized to all the entities falling under that category. An embodiment of the audiovisual processing server is generally indicated in FIG. 2 and described in greater detail below.

The various servers of FIG. 1 may each include one or more processors executing computer program instructions and interacting with other system components for performing the various functionalities described herein. The computer program instructions are stored in a memory implemented using a standard memory device, such as for example, a random-access memory (RAM). The computer program instructions may also be stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present disclosure.

In an embodiment, the terms "interaction" and "communication" are used interchangeably, and generally refer to any real-time and non real-time interaction that uses any communication channel including, without limitation, telephony calls (PSTN or VoIP calls), emails, vmails, video, chat, screen-sharing, text messages, social media messages, WebRTC calls, etc.

Editable Audiovisual Interface

FIG. 2 is a diagram illustrating an embodiment of a block diagram of an audiovisual processing server 175. The audiovisual processing server 175 may be part of the contact center 100 and may further be comprised of two systems: a video processing system 205 and a speech recognition system 210. The video processing system 205 may also be comprised of: a feature detection application 206, an action detection application 207, an optical character recognition (OCR) application 208, and an entity detection application 209. In an embodiment, the feature detection application 206, action detection application 207, OCR application 208, and entity detection application 209 may be realized as services accessible by the video processing system 205 or as separate systems working in concert with the video processing system 205.

In an embodiment, the feature detection application 206 may be used to divide an incoming video file into individual video frames, groupings of individual video frames, or shorter video clips. The feature detection application 206 may use Scale-invariant feature transformation (SIFT) to perform feature detection. SIFT may be deployed to take video as input and splits it into frames. The number of frames that the video is split into can be predetermined based on a set number of frames per minute of video. It begins to perform image processing using SIFT methodology that perform local feature extraction from these frames. Each frame is processed and compared with the frames before and after it. Where there is movement, the frames change constantly, and the methodology recognizes that there is a continuous action being performed. When there is a pause between the actions, the frames remain identical and the methodology splits the video into a number of video clips. This may be performed repeatedly in a loop to split the video into required number of video clips based on actions performed. After dividing the video into a number of video clips, the last frame of each video clip may be utilized to perform additional analysis on each video clip using action detection application 207 and optical character recognition (OCR) application 208. An entity detection application 209 may be used to detect an interacted entity during the generated audiovisual clip. An entity might comprise a web browser object in a web browser window. The stitching system 211 may be used to identify the audio portion which is relevant to the video action and then stitch them together.

In an embodiment, the action detection application 207 may be configured to detect and recognize actions depicted in an incoming video file. The action detection application 207 may deploy an appropriate methodology (e.g., a convolutional neural network) to classify frames in a video, such as to determine an action being taken on a particular object in the frame of the video. For example, if a circle is drawn in the video of the incoming video file, then the action detection application 207 may be configured to detect that an action has occurred during the time period of the circle being drawn. The action detection application 207 may also be configured to identify any objects on screen that are associated with the particular circle being drawn.

In an embodiment, the OCR application 208 may be configured to detect and recognize text typed during the incoming video file to determine text written over frames in the incoming video file. The OCR application 208 may deploy an appropriate methodology to classify text in a video. For example, STN-OCR, a single semi-supervised Deep Neural Network (DNN), consisting of a spatial transformer network (which may be used to detect text regions in frames) and a text recognition network (which recognizes the textual content of the identified text regions) may be deployed in OCR application 208. The OCR application 208 may provide text information synchronized with certain actions detected by the action detection application 207.

The speech recognition system 210 may be configured to detect and recognize speech patterns and transcribe the spoken words into written text. The speech recognition system 210 may deploy an appropriate methodology to recognize spoken words in an audio file. For example, Natural Language Processing (NLP) and Supervised Machine Learning (ML) may be deployed in the speech recognition system 210. The speech recognition system 210 may also generate text information synchronized with certain actions detected by the action detection application 207.

Figure 3A:
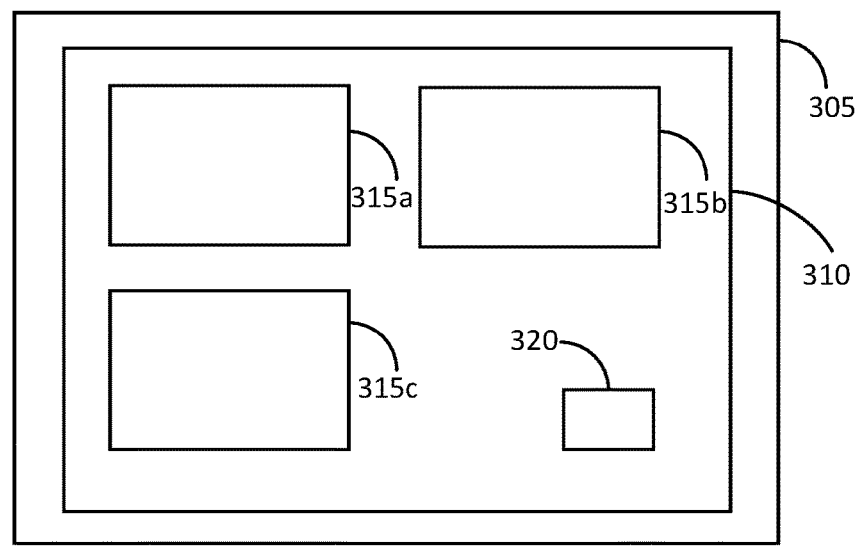
FIG. 3A is a diagram illustrating an embodiment of a web-connected user device displaying a web browser window.

FIG. 3A is a diagram illustrating an embodiment of a web-connected user device displaying a web browser window, indicated generally. The web-connected user device 305 may be a personal computer, a mobile device, tablet, smart television, gaming console, or other device that can, for example, render HTML code to generate textual and graphical web pages on a computing device. The web-connected user device 305 may contain a screen or monitor for viewing rendered web pages. The web-connected user device 305 may display a web browser window 310. The web browser window 310 may be generated through a web- or Internet-browser application or program (e.g. Internet Explorer or Google's Chrome) on the web-connected user device 305.

Web browser objects 315a, 315b, 315c (collectively 315) are elements seen in the web browser window 310. A web browser object 315 may include content rendered in the web browser window 310 by the web- or Internet-browser application or program on the web-connected user device 305. Content shown as a web browser object 315 may include, but not be limited to, text, graphics, tables, hyperlinks, and embedded objects. While only three web browser objects 315 are illustrated for simplicity, the web browser window 310 may contain any number of web browser objects 315.

Figure 3B:
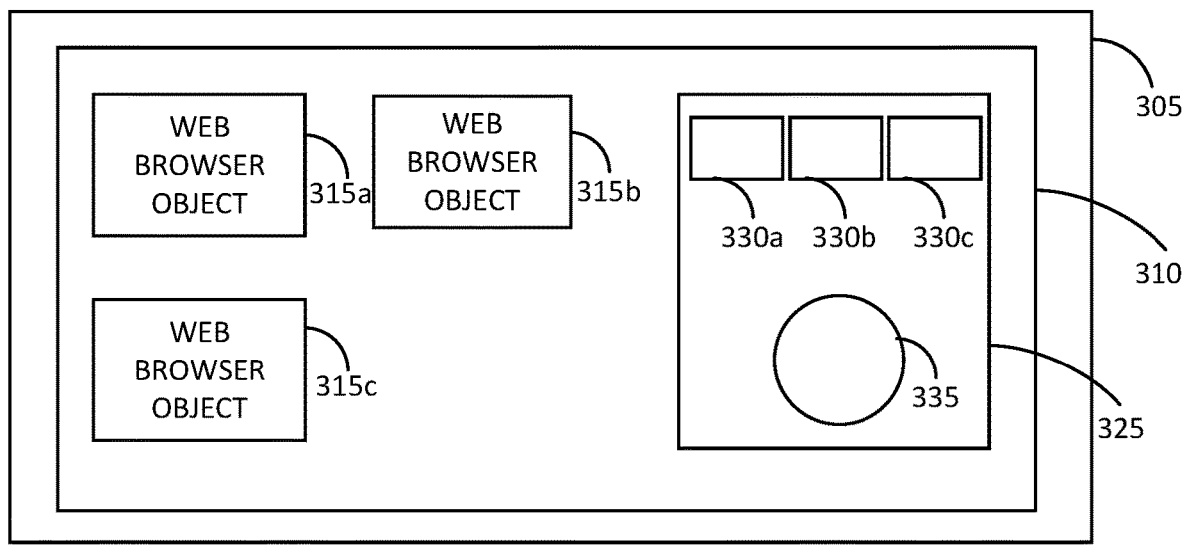
FIG. 3B is a diagram illustrating an embodiment of a web-connected user device displaying a web browser window.

A web browser window 310 may also contain an editable audiovisual interface engagement object 320, which may be used to engage an editable audiovisual interface 325 that assists in capturing queries to be handled by the contact center (described in greater detail in FIG. 3B). The editable audiovisual interface engagement object 320 may be depicted as a button or clickable image shown in web browser window 310. The position of the object 320 may be located in any reasonable position in the window 310. In FIG. 3A, it is generally depicted in the lower right corner, for example.

The editable audiovisual interface engagement object 320 may be provided through a platform or service from a source different than the source of the content of the web browser window 310 (e.g., Genesys Web Engagement by Genesys Telecommunications Laboratories, Inc.). For example, a business enterprise, such as an online marketplace, may have a website shown in web browser window 310 containing a webpage of showing a particular product for sale by the business enterprise. In an embodiment, a contact center may provide the editable audiovisual interface engagement object 320 as an overlay in the web browser window 310 through a web server 155 that is not controlled by the business enterprise. However, it may appear to a user of the web browser window 310 as a single, integrated web page.

FIG. 3B is a diagram illustrating an embodiment of a web-connected user device displaying a web browser window, indicating generally. The embodiment described in FIG. 3B may further comprise an editable audiovisual interface for the web browser window. The editable audiovisual interface 325 may be displayed in a plurality of ways. In an embodiment, the interface 325 may be displayed as a separate window within the web browser of the user device 305. In another embodiment, it may be displayed as an overlaid window on top of the web browser window 310. In another embodiment, it may be displayed as a separate application that may interact with web browser window 310.

The editable audiovisual interface 325 may be displayed on the web browser window 310 after the user engages with the editable audiovisual interface engagement object 320. The editable audiovisual interface 325 may also be displayed on the web browser window 310 after the user is provided a link from a communication (such as an email or SMS text message) to engage the editable audiovisual interface 325. The editable audiovisual interface 325 may also be displayed on the web browser window 310 as directed by a remote system, such as a contact center, whereby an agent of the contact center may direct the engagement of the editable audiovisual interface 325.

In an embodiment, the editable audiovisual interface 325 may be configured to generate a multimedia enabled and enriched video mail to be sent to the contact center. The editable audiovisual interface 325 may permit an end user to create an enriched video within the web browser window 310 incorporating web browser objects 315 into the enriched video. Creating an enriched video within the web browser window 310 permits the user of the editable audiovisual interface 325 to identify or capture a query or issue for the business enterprise at the site of the origination of the question or problem. For example, if a customer has a question that presents itself from a certain webpage of the enterprise, then the customer is able to seek help to answer that question directly from that webpage. In another example, if a customer is shopping an online retailer and has a question about a particular product offering on a webpage, the customer is able to create an enriched video specifically identifying the portion of the webpage that raises the question without having to switch to another medium (e.g. email or phone call) to seek an answer.

The editable audiovisual interface 325 may include a recording object 335 to initiate the creation of the enriched video. The record object 335 may be presented as a text, button, graphic or known depiction. The record object 335 may be clicked on or selected to initiate creation of the enriched video. The recording object 335 may be selected a second time to terminate creation of the enriched video. The editable audiovisual interface 325 may include action objects 330a, 330b, and 330c (collectively 330). Action objects 330, comprising provided tools, may permit the user of the editable audiovisual interface 325 to talk, point, draw, comment, and zoom in on parts of the web browser objects 315. For example, once recording begins, a user can start talking, zoom into a frame, and scribble annotations where required. Such gestures may be captured in synchronization with the accompanying audio and together create an audiovisual communication through the enriched video.

Figure 4:
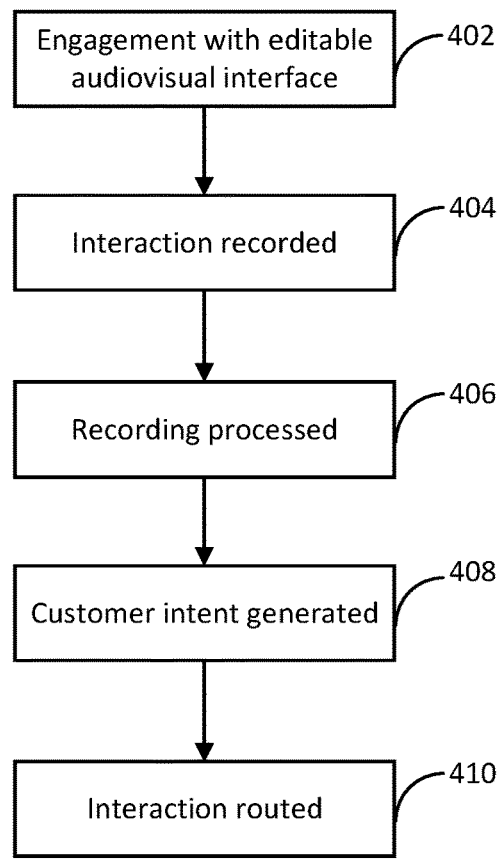
FIG. 4 is a flow diagram illustrating an embodiment of a process for an inbound asynchronous audiovisual channel using an editable audiovisual interface.

FIG. 4 is a flow diagram illustrating an embodiment of a process for an inbound asynchronous audiovisual channel using an editable audiovisual interface, indicated generally at 400. The process 400 may occur in the contact center 100.

In operation 402, a party browsing the website, such as customer, engages with an editable audiovisual interface 325. The customer may initiate engagement with an editable audiovisual interface 325 by clicking over the editable audiovisual interface engagement object 320 in the web browser window 310. For example, a customer may be browsing for a table at an e-commerce furniture store. Prior to shopping the e-commerce furniture store, the customer has certain expectations for the color, price, and specifications of the table. Not finding these expectations met on the website, the customer may seek to initiate engagement with an editable audiovisual interface 325 to express the expectations for the customer's desired table. It may be that the customer desires a table with black color for given specifications but can only locate a table in brown. The customer may also initiate engagement with the editable audiovisual interface 325 by: selecting a hyperlink presented on a web browser window 310, selecting a link provided through an email communication via web server 155, or through a link in a text or SMS communication on a mobile device via multimedia/social media server 150. Control passes to operation 404 and the process continues.

In operation 404, the customer interaction with the editable audiovisual interface 325 is recorded. The interaction can include actions taken on top of, and in concert with a web browser object 315. Action might include sketching, which comprises drawing, adding text, annotating, scribbling, highlighting, scrolling, pointing, zooming, etc. Referring to the table, after initiating a recording of the customer interaction, the customer may select an action object 330 for freehand drawing over a web browser object 315. In an embodiment, recording may be initiated by the customer clicking on the record object 335. The customer may draw a circle around a web browser object 315 of a table similar to the customer's desired specifications for the table. The customer may draw freehand over a web browser object 315. The customer may also type text ("I want this table in black") over the web browser object 315 of a table similar to the customer's desired specifications for the table. The customer may also initiate a speech recording as part of creating an enhanced video. The customer may conclude recording the interaction through the editable audiovisual interface 325 by clicking on (or selecting) the record object 335 a second time. Control passes to operation 406 and the process continues.

In operation 406, the recorded is processed. For example, the customer interaction may be processed through video and speech processing systems. The video processing system may analyze the recorded customer interaction for key actions taken by the user during the session. The speech processing system may analyze the recorded customer interaction for spoken key words during the session. The audio video stitching system 211 identifies which portion of audio needs to be correlated/stitched with which portion of an action. The video processing system may recognize that a web browser object 315 the customer interacts with comprises a table. The speech processing system may recognize the customer used the words "black" and "table." Appropriate video and speech processing systems may be included as part of the audiovisual processing server 175 as described above. In an embodiment, the customer interaction may be analyzed by an audiovisual processing server 175 utilizing operation 600, as described in greater detail below. Control passes to operation 408 and the process continues.

In operation 408, intent may be generated. For example, customer intent may be generated from the recorded interaction. The provided video and speech processing systems utilized at operation 406, along with the stitching system 211, may generate content information from the recorded customer interaction. The processing systems may generate an appropriate output, such as a JSON object, that can be utilized by other systems of the contact center 100. For example, the processing system may generate a customer's intent that they are seeking a black table, based on the processed video and speech from the recorded interaction. Additional information may be obtained, such as customer-identifying information (including customer contact information). Control passes to operation 410, and the process continues.

In operation 410, the interaction is routed. In an embodiment, the interaction may be routed to an agent for handling based on the derived customer intent. An appropriate routing device, such as routing server 130, may utilize the generated customer intent of operation 408 to determine the most appropriate agent to handle a response to the interaction. The agent may be an artificial agent, such as a chatbot directed by a multimedia/social media server 150, an IMR device directed by an IMR server 125, or a live agent utilizing an agent device 145. The routing device might determine a chatbot is the agent most likely to provide a response to meet the customer's expectations in the customer intent. The chatbot may be able to provide a link in a chat conversation overlaid in web browser window 310, providing a link to a suggested table that more closely meets the determined customer intent for that customer searching for a black table. In another embodiment, the routing device may also determine a live agent will most likely provide a response to meet the customer's expectations. The customer interaction may be forwarded to the agent device 145 of the agent, including the recording of the enhanced video, and the output of the processing system with the information of the determined customer intent. The agent may then use an appropriate communication channel, such as a web chat, video call, voice call, or email, etc., to handle the interaction. The generated customer intent provided to the agent device 145 can be viewed by the agent prior to watching video of the customer interaction.

In an embodiment, the interaction may be routed to a contact center analytics system for analysis and data storage based on the determined customer intent. An analytics system may be able to aggregate the determined customer intents and provide the business with market information about unmet customer expectations. The business enterprise may be able to use the aggregated customer intents to add, remove, or modify product offerings. For example, if the aggregated customer intent data shows a number of customers are seeking a black table, but the e-commerce furniture store does not presently offer a black table, then the e-commerce furniture store may seek to add a black table as part of its product offerings.

Figure 5:
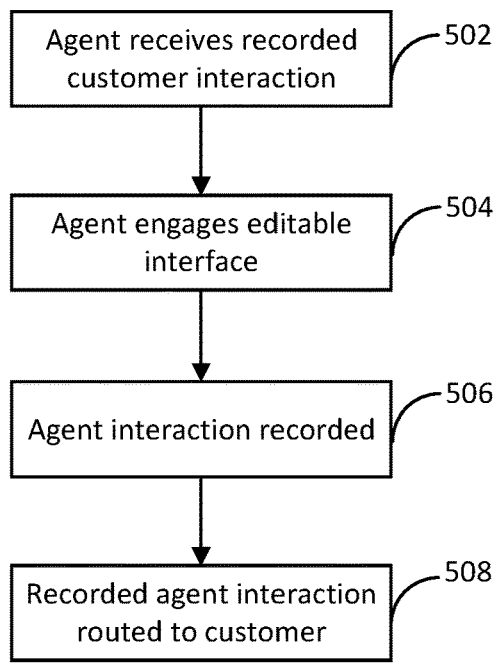
FIG. 5 is a flow diagram illustrating an embodiment of a process for an outbound asynchronous audiovisual channel using an editable audiovisual interface.

FIG. 5 is a flow diagram illustrating an embodiment of a process for an outbound asynchronous audiovisual channel using an editable audiovisual interface for a contact center, indicated generally at 500. The process 500 may occur in the contact center 100.

Just as a customer may utilize the asynchronous audiovisual channel to express the customer's expectations to the business enterprise through the contact center, an agent of the contact center may also utilize the asynchronous audiovisual channel to contact a customer. An agent may use asynchronous audiovisual channel to respond to a previously-received recorded customer interaction or respond to a communication from a customer received through other contact center channels, such as a voice call, text message, or web chat.

In operation 502, an agent receives a recorded customer interaction. In an embodiment, if a routing server 130 determines that a live agent would provide the best chance of a favorable resolution, then the routing device may transmit the recorded customer interaction for receipt by the workbin 146 of agent device 145 for handling by the agent. However, the editable audiovisual interface from the asynchronous audiovisual channel may be made available to a live agent to provide a contact with a customer even if the customer did not provide an incoming recorded customer interaction. Control passes to operation 504 and the process 500 continues.

In operation 504, the agent engages with the editable audiovisual interface. The agent can review the recorded interaction and edit the video using the editable audiovisual interface from the asynchronous audiovisual channel the customer utilized. In an embodiment, a live agent can activate the editable audiovisual interface 325 from the asynchronous audiovisual channel using an editable audiovisual interface engagement object 320 as part of the agent device 145. Once activated, the agent can interact with the editable audiovisual interface 325 in a manner as described in operation 402 of operation 400. Control passes to operation 506 and the process continues.

In operation 506, the agent interaction with editable interface may be recorded. In an embodiment, the agent interaction can include actions taken on top of, and in concert with a web browser object 315, such as sketching or the addition of speech. The agent may initiate recording of the interaction by clicking on record object 335. The agent may then select from the action objects 330 to mark up a web browser object 315. The agent may conclude recording by clicking on the record object 335 a second time, completing the creation of the enriched video. Control passes to operation 508 and the process continues.

In operation 508, the recorded agent interaction is routed to a customer and the process 500 ends. For example, the contact center may route the recorded agent interaction to the customer using appropriate means of the contact center (including information collected from the customer), such as the routing server 130, the multimedia/social media server 150, web servers 155, or other appropriate means of communication. In an embodiment, the customer may receive the agent interaction as a link to the recorded agent interaction embedded in an email, text message, or other appropriate application or channel for communication. In an embodiment, the recorded agent interaction may be preserved in an appropriate medium, such as storage device 135. The storage device 135 may also store the customer interaction and interaction data for other appropriate uses by a contact center for the business enterprise.

In an embodiment, the combination of the use of operation 400 and operation 500 permits a contact center to enable a fully duplexed asynchronous audiovisual channel, permitting customers and agents to use recorded interactions asynchronously to communicate through the contact center.

Figure 6:
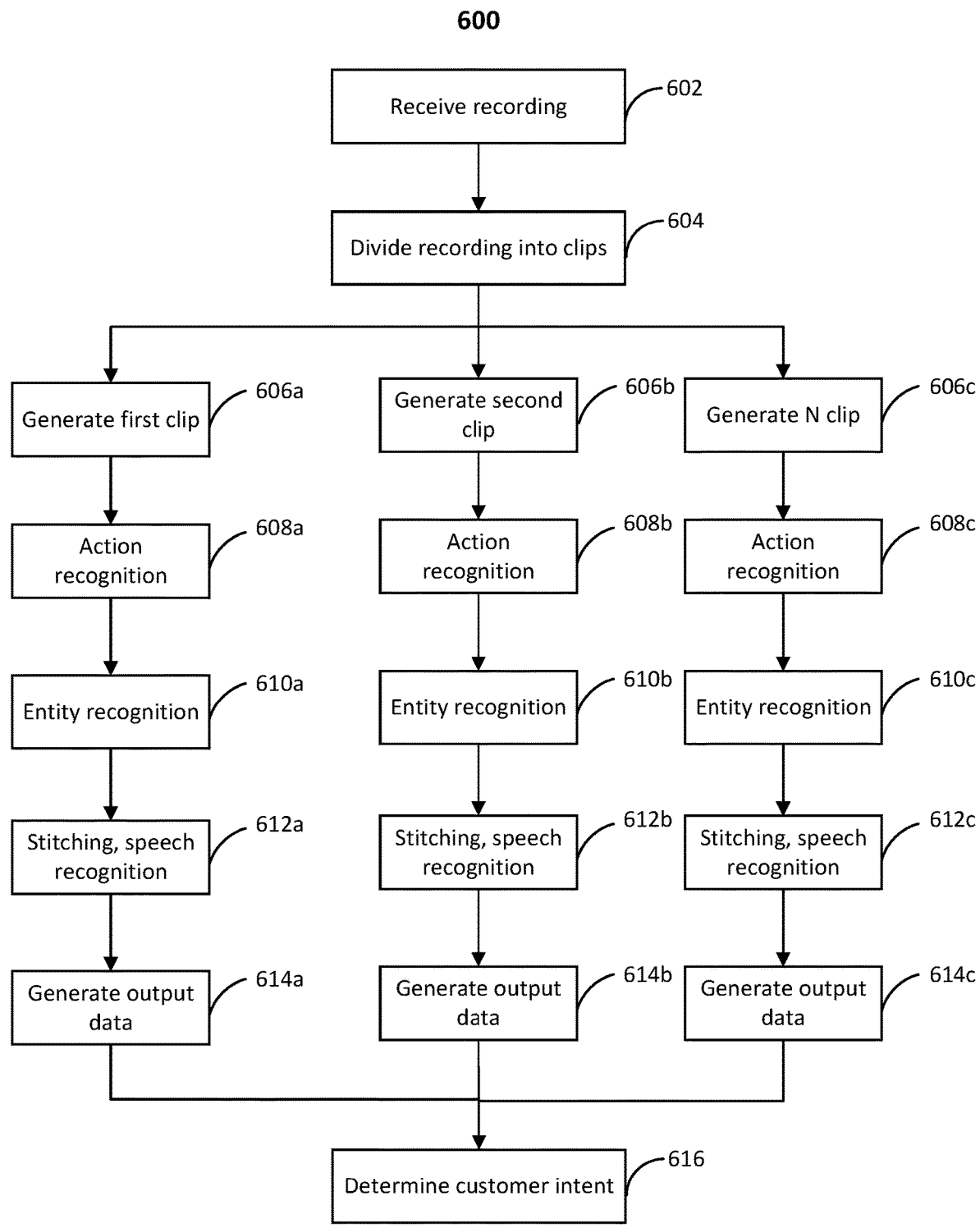
FIG. 6 is a flow diagram illustrating an embodiment of a process for audiovisual processing of the asynchronous audiovisual channel.

FIG. 6 is a flow diagram illustrating an embodiment of a process for audiovisual processing of the asynchronous audiovisual channel, indicated generally at 600. The process 600 may occur in the audiovisual processing server 200, or similar audiovisual processing system.

In operation 602, a recording is received by an audiovisual processing system. For example, the audiovisual processing server 200 receives an audiovisual interface recording generated through the editable audiovisual interface 325. The recording may be generated as described in operation 400 for a customer-initiated contact. Upon receipt of the recording by the processing system, control passes to operation 604 and the process continues.

In operation 604, the recording is divided into a plurality of video clips. In an embodiment, the dividing may be performed by the feature detection application 206 as part of the video processing system 205. The feature detection application 206 may use Scale-invariant feature transformation (SIFT) to split the input video into frames. Each frame of the editable audiovisual interface recording is processed and compared with the surrounding frames. The comparison is searching for movement or pauses. For example, where there is movement in the editable audiovisual interface recording, such as when a user draws a freehand circle on the screen (to name a non-limiting example), the frames of the video change constantly and the methodology recognizes that there is a continuous action being performed. In another example, when there is a pause between the actions the frames remain identical, and feature detection application 206 can record the frame in the video corresponding to where there is a pause between the actions. After feature detection application 206 completes processing and recording the frame(s) in the video corresponding to where there is a pause between the actions, control of operation 600 passes to operation 606 and the process continues.

In operation 606, a plurality of shorter audiovisual clips are generated from the editable audiovisual interface recording. For simplicity, this is illustrated in FIG. 6 as 606*a*, 606*b*, and 606*c* (collectively 606). Any number of audiovisual clips may be generated where N (606*c*) represents this. Utilizing the analysis performed by feature detection application 206 to determine pauses in action from the editable audiovisual interface recording, the audiovisual clips are generated by dividing the editable audiovisual interface recording at the determined pauses in the action. FIG. 6 depicts the generation of at least three unique clips from audiovisual interface recording, but the number of clips generated is not set at three, as 1 to n number of clips could be generated from the audiovisual interface recording. Upon receipt of the audiovisual interface recording by the processing system, control of operation 600 passes to operation 608 and the process continues.

In operations 608*a*, 608*b*, and 608*c* (collectively 608), action recognition is performed on each of the generated audiovisual clips from operation 606 respectively. Action recognition may be performed by an appropriate processing system, such as the action detection application 207. Action detection application 207 may deploy an appropriate methodology to classify frames in a video, such as determine an action being taken on a particular object in the frame of the video. For example, if a circle is drawn in the video of a generated audiovisual clip, then action detection application 207 may be configured to detect that an action has occurred during the time period of the circle being drawn. Action detection application 207 may also denote the location in the frame of the video the action is being performed. The OCR application 208 may be configured to detect and recognize text typed during the incoming video file to determine text written over frames in the incoming video file. Control of operation 600 passes to operation 610 and the process continues.

In operations 610*a*, 610*b*, and 610*c* (collectively 610), entity recognition is performed on each of the generated audiovisual clips. Entity recognition may be performed by an appropriate processing system, such as the action detection application 207. Using the identified location in the frame of the video the action is being performed from operation 608, action detection application 207 may identify any objects on screen that are associated with the detected action from operation 608. For example, if a circle is drawn around a picture of a table in the video of a generated audiovisual clip, then action detection application 207 will seek to recognize the table in the video frame at operation 610. Control of operation 600 passes to operation 612 and the process continues.

In an embodiment, operations 608, 610, and 612 do not need to occur in the order illustrated at 600 but may occur in an order set by an administrator or chosen by the contact center.

In operations 612*a*, 612*b*, and 612*c* (collectively 612), the stitching system 211 identifies the audio portion relevant to the video action and stitches these together. Speech recognition is performed on each of the generated audiovisual clips. Speech recognition may be performed by an appropriate processing system, such as the speech recognition system 210. The speech recognition system 210 may be configured to detect and recognize speech patterns and transcribe the spoken words into written text. Speech recognition system 210 may deploy an appropriate methodology to recognize spoken words in an audio file. For example, Natural Language Processing (NLP) and Supervised Machine Learning (ML) may be deployed in speech recognition system 210. The speech recognition system 210 may generate text information synchronized with certain actions detected by the action detection application 214. Control of operation 600 passes to operation 614 and the process continues.

In operations 614*a*, 614*b*, and 614*c* (collectively 614), output data from the audiovisual processing of the audiovisual clips is generated. For example, the output data combines the data generated from the action recognition 608, the entity recognition 610, and the speech recognition 612 into an output data. Control of operation 600 passes to operation 616 and the process continues.

In operation 616, a customer intent is determined from the output data from the audiovisual processing of the audiovisual clips from operation 614. For example, an appropriate processing system will correlate together information gathered in the process 600 to extract different parameters from the intent. A determined customer intent may include, for example, a desire for a particular product or service offering, a desire for a modification from a particular product or service offering, a customer mood (i.e. is the customer angry?), the urgency of the concern raised by the customer, and an identification of an appropriate department for handling a response to the recording. Routing parameters may also be generated for routing to an appropriate agent for handling. In an embodiment, the determined customer intent may be expressed as a JSON object, a BSON object, YAML format, etc.

Figure 7A:
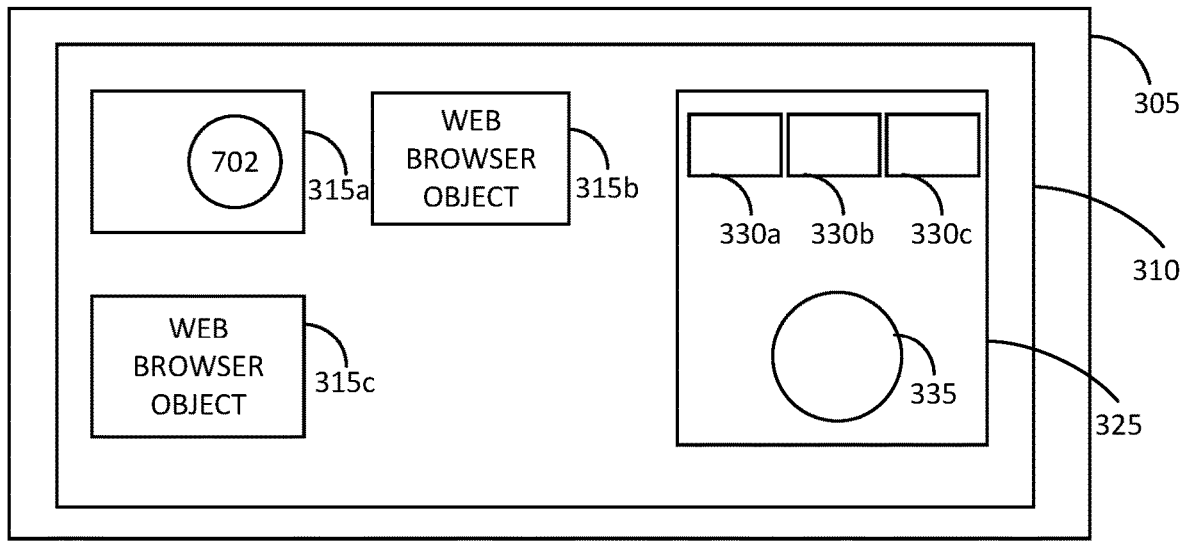
FIG. 7A is a diagram illustrating an embodiment of a web-connected user device displaying a web browser window and an editable interface.

FIG. 7A is a diagram illustrating an embodiment of a web-connected user device displaying a web browser window and an editable interface, indicated generally. FIG. 7A comprises an interface point 702 for a web browser object in the web browser window. The web object interface point 702 provides an interaction point for the editable audiovisual interface 325 to interact with a web browser object 315*a*. In an embodiment, the web object interface point 702 may be depicted as a visual representation, such as a circle shown on web-connected user device 302 or may be a "virtual" circle without a depiction on web-connected user device 302. Web object interface point 702 permits the user to access additional information associated with a web browser object 315 through user selection.

Figure 7B:
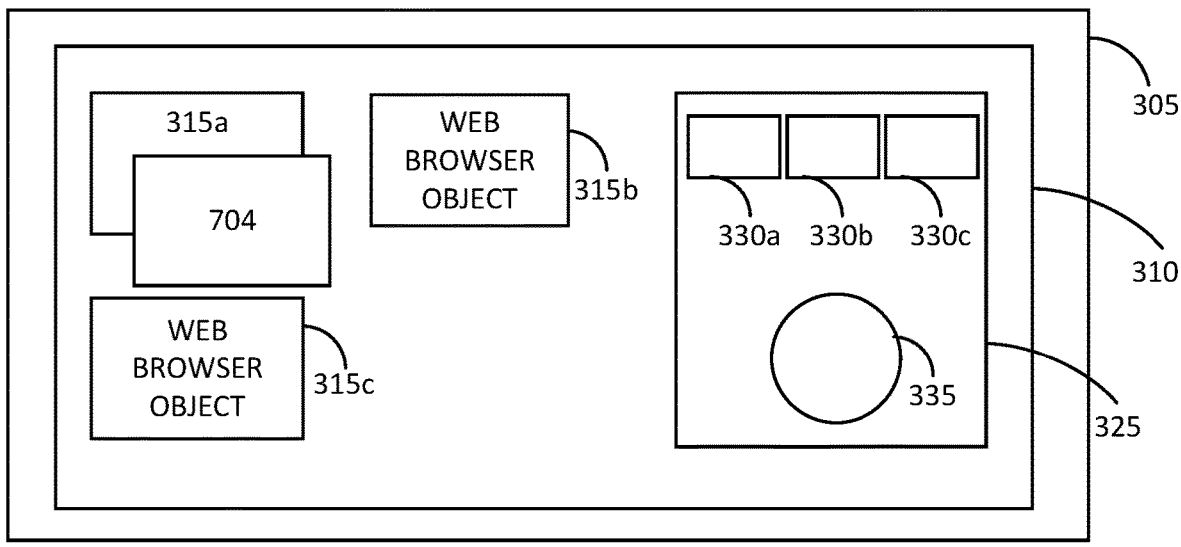
FIG. 7B is a diagram illustrating an embodiment of a web-connected user device displaying a web browser window and an editable interface.

FIG. 7B is a diagram illustrating an embodiment of a web-connected user device displaying a web browser window and an editable interface, indicated generally. In an embodiment, FIG. 7B may further comprise a pop-up frequently asked questions window. After the user interacts with web object interface point 702, a recommendation window 704 may appear on the web-connected user device 305. Recommendation window 704 may contain content generated through the recommendation engine 170 associated with content determined by information derived from other customer's recordings from the editable audiovisual interface 325. Recommendation window 704 may appear as a list of previously-identified issues or frequently-asked questions associated with the interface point 702 linked with web browser object 315. In an embodiment, the recommendation window may appear as a list of issues most commonly asked for an entity, a webpage, or by a user, or any combination of these.

Figure 8:
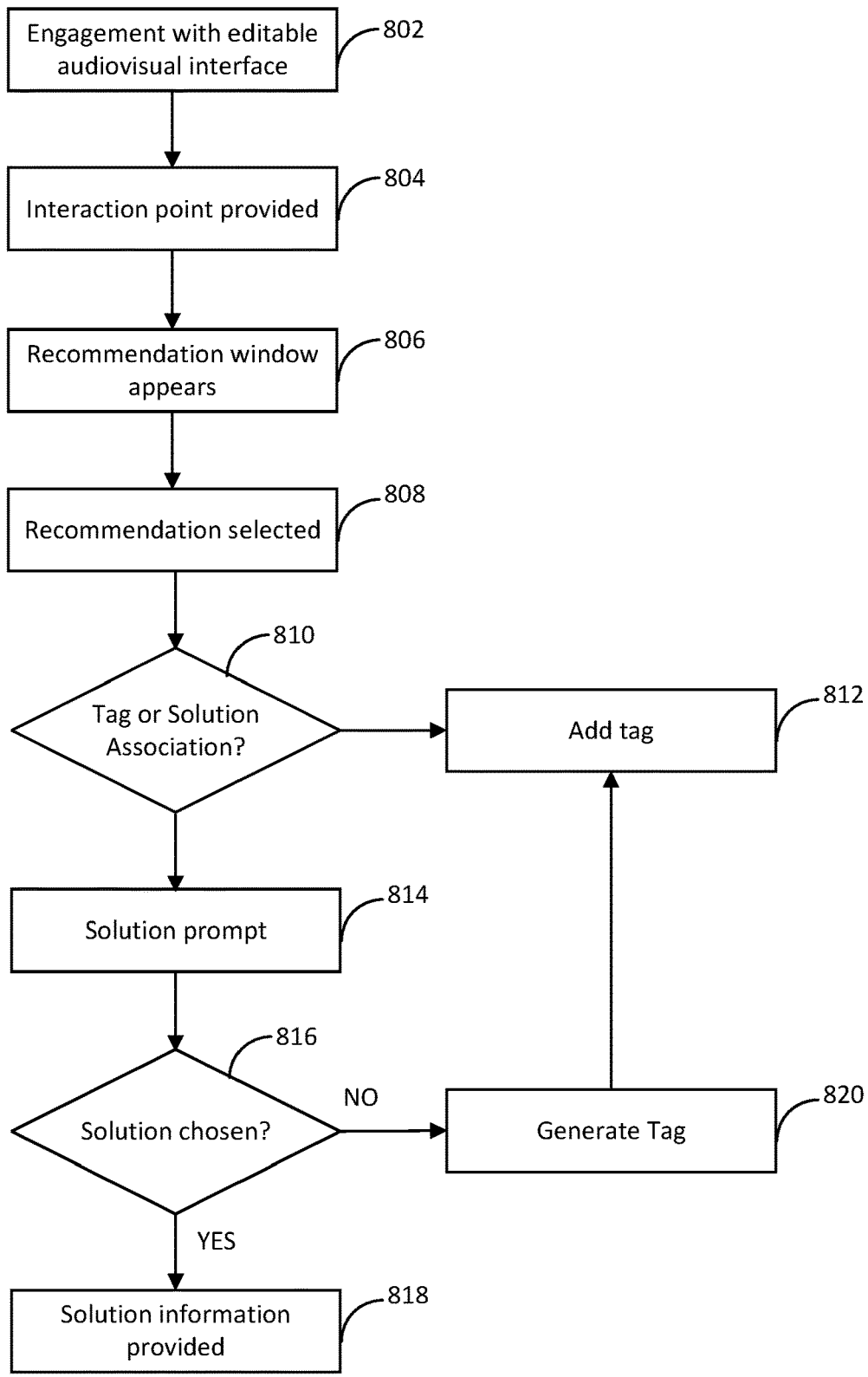
FIG. 8 is a flow diagram illustrating an embodiment for providing recommended asynchronous solutions through an asynchronous audiovisual channel.

FIG. 8 is a flow diagram illustrating an embodiment for providing recommended asynchronous solutions through an asynchronous audiovisual channel, indicated generally at 800.

In operation 802, a customer engages the editable audiovisual interface 325. The user may initiate the editable audiovisual interface 325 as previously described in operation 404 of operation 400. Editable audiovisual interface 325 may be then displayed on the web-connected user device 302. Control passes to operation 804 and the process 800 continues.

In operation 804, editable audiovisual interface 325 provides an interaction point on a web browser object 315. The interaction point may use an interface as the disclosed web object interface point 702. An interaction point may be provided for each web browser object 315 or only certain web browser objects 315. A visual indication may also be provided when the interface point 702 is selected. Control passes to operation 806 and the process continues.

In operation 806, a recommendation window appears when the user interacts with the interface point 702. For example, the recommendation window may appear as recommendation window 704, which may include a list of recommendations or previously-asked questions. The contents of the list may be received from a recommendation server 170. The recommendation engine on the server 170 may be prepopulated using data from mass storage device 135 including agent data, customer data, and interaction data to compile a list of known questions and answers about the goods and/or services offered by a business. The recommendation engine may use information extracted from previous interactions of customers utilizing the asynchronous audiovisual channel. For example, the recommendation engine may use a determined intent (e.g. "customer wants the table in black color") to add to a question posed to the recommendation engine (e.g. "Is this table available in a different color?"). The recommendation engine may associate specific goods and/or services offered by the business with specific previously-asked questions concerning those specific goods and/or services. The recommendation engine may associate specific goods and/or services with particular web browser objects 315 indicative of those goods and/or services, thereby associating specific previously-asked questions with particular web browser objects 315. The recommendation window 704 may provide a specific number of recommendations associated with a particular web browser object 315, at a predetermined number of recommendations or by a set threshold associated with the quality of the recommendation. Control passes to operation 808 and the process continues.

In operation 808, the user selects a recommendation from the recommendation window 704 at operation 808. The user selection may be made by, for example, clicking on a recommendation populated in the recommendation window 704. Control passes to operation 810 and the process continues.

In operation 810 it is determined whether the selected recommendation from operation 808 is associated with a known solution or an issue tag (alternatively referred to herein as a Recommended Option Tag). If it is determined that the selected recommendation is associated with a known solution, then control passes to operation 814 and the process continues. If the selected recommendation from operation 808 is associated with an issue tag, then control passes to operation 812 and the process continues.

A known solution may be defined as a determined answer to the recommendation posed as a question. For example, for the recommendation "Is this table available in a different color?", a recommendation with a known solution would have a response to the question, such as "Yes, the table is available in white" or "No, the table is not available in another color." An issue tag is associated with recommendations that currently do not have determined answers to the recommendation posed as a question. For example, for the recommendation "Is this table available in a different size?" may only have an issue tag of "size" associated with the recommendation if the recommendation engine does not have a known response to this question.

In operation 812, the issue tag associated with the selected recommendation is associated with the current customer interaction. The issue tag could be presented as a combination of different media. In this case, if the selected recommendation "I wish to know about other colors," is selected from recommendation window 704, then this tag of "I wish to know about other colors" will be added to the editable audiovisual interface recording. Operation 800 ends, permitting the customer using the editable audiovisual interface to continue making a recording through the editable audiovisual interface. In an embodiment, the interaction may be sent to a live agent for handling.

In operation 814, the customer is prompted with the option to see the known solution associated with the selected recommendation. For example, the known solution may be provided to the customer in the form of a text from a frequently asked question, a link to another portion of the website, a previous recording through the asynchronous audiovisual channel, or through other acceptable methods of communicating information to the customer. The known solution may also provide a summary of its contents to the customer with the option to see the known solution associated with the selected recommendation. Control is passed to operation 816 and the process continues.

In operation 816, it is determined whether the customer accepts the known solution provided to the customer in response to the selected recommendation. If the customer accepts the known solution, then the known solution is presented to the customer at operation 818 and the operation 800 ends. This indicates the customer finds the known solution acceptable and no further information may be required to provide to the customer. If the customer does not accept the known solution, then the known solution may not be an acceptable response to the selected recommendation and further refinement of the known solutions associated with the selected recommendation may be needed by the recommendation engine. If the customer does not accept the known solution, then control of operation 800 passes to operation 820, whereby an issue tag is generated from the selected recommendation and operation 800 continues back to operation 812.

Computer Systems

In an embodiment, each of the various servers, controls, switches, gateways, engines, and/or modules (collectively referred to as servers) in the described figures are implemented via hardware or firmware (e.g., ASIC) as will be appreciated by a person of skill in the art. Each of the various servers may be a process or thread, running on one or more processors, in one or more computing devices (e.g., FIGS. 9A, 9B), executing computer program instructions and interacting with other system components for performing the various functionalities described herein. The computer program instructions are stored in a memory which may be implemented in a computing device using a standard memory device, such as, for example, a RAM. The computer program instructions may also be stored in other non-transitory computer readable media such as, for example, a CD-ROM, a flash drive, etc. A person of skill in the art should recognize that a computing device may be implemented via firmware (e.g., an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the disclosed embodiments. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 9A:
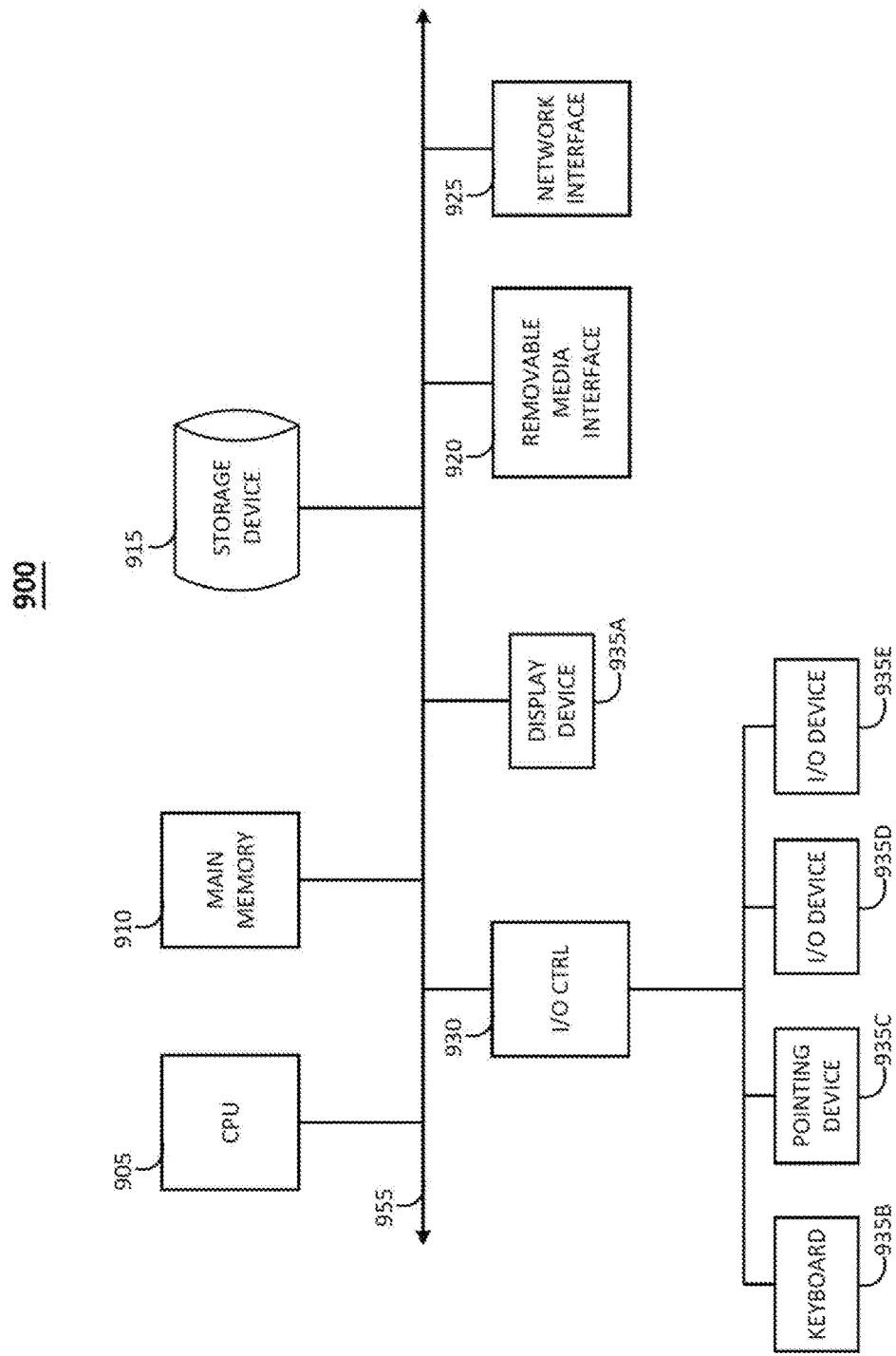
FIG. 9A is a diagram illustrating an embodiment of a computing device.

FIG. 9A and FIG. 9B are diagrams illustrating an embodiment of a computing device as may be employed in an embodiment of the invention, indicated generally at 900. Each computing device 900 includes a CPU 905 and a main memory unit 910. As illustrated in FIG. 9A, the computing device 900 may also include a storage device 915, a removable media interface 920, a network interface 925, an input/output (I/O) controller 930, one or more display devices 935A, a keyboard 535B and a pointing device 935C (e.g., a mouse). The storage device 915 may include, without limitation, storage for an operating system and software. As shown in FIG. 9B, each computing device 900 may also include additional optional elements, such as a memory port 940, a bridge 945, one or more additional input/output devices 935D, 935E, and a cache memory 950 in communication with the CPU 905. The input/output devices 935A, 935B, 935C, 935D, and 935E may collectively be referred to herein as 535.

The CPU 905 is any logic circuitry that responds to and processes instructions fetched from the main memory unit 910. It may be implemented, for example, in an integrated circuit, in the form of a microprocessor, microcontroller, or graphics processing unit, or in a field-programmable gate array (FPGA) or application-specific integrated circuit (ASIC). The main memory unit 910 may be one or more memory chips capable of storing data and allowing any storage location to be directly accessed by the central processing unit 505. As shown in FIG. 9A, the central processing unit 905 communicates with the main memory 910 via a system bus 955. As shown in FIG. 9B, the central processing unit 905 may also communicate directly with the main memory 910 via a memory port 940.

In an embodiment, the CPU 905 may include a plurality of processors and may provide functionality for simultaneous execution of instructions or for simultaneous execution of one instruction on more than one piece of data. In an embodiment, the computing device 900 may include a parallel processor with one or more cores. In an embodiment, the computing device 900 comprises a shared memory parallel device, with multiple processors and/or multiple processor cores, accessing all available memory as a single global address space. In another embodiment, the computing device 900 is a distributed memory parallel device with multiple processors each accessing local memory only. The computing device 900 may have both some memory which is shared and some which may only be accessed by particular processors or subsets of processors. The CPU 905 may include a multicore microprocessor, which combines two or more independent processors into a single package, e.g., into a single integrated circuit (IC). For example, the computing device 900 may include at least one CPU 905 and at least one graphics processing unit.

In an embodiment, a CPU 905 provides single instruction multiple data (SIMD) functionality, e.g., execution of a single instruction simultaneously on multiple pieces of data. In another embodiment, several processors in the CPU 905 may provide functionality for execution of multiple instructions simultaneously on multiple pieces of data (MIMD). The CPU 905 may also use any combination of SIMD and MIMD cores in a single device.

FIG. 9B depicts an embodiment in which the CPU 905 communicates directly with cache memory 950 via a secondary bus, sometimes referred to as a backside bus. In other embodiments, the CPU 905 communicates with the cache memory 950 using the system bus 955. The cache memory 950 typically has a faster response time than main memory 910. As illustrated in FIG. 9A, the CPU 905 communicates with various I/O devices 935 via the local system bus 955. Various buses may be used as the local system bus 955, including, but not limited to, a Video Electronics Standards Association (VESA) Local bus (VLB), an Industry Standard Architecture (ISA) bus, an Extended Industry Standard Architecture (EISA) bus, a Micro Channel Architecture (MCA) bus, a Peripheral Component Interconnect (PCI) bus, a PCI Extended (PCI-X) bus, a PCI-Express bus, or a NuBus. For embodiments in which an I/O device is a display device 935A, the CPU 905 may communicate with the display device 935A through an Advanced Graphics Port (AGP). FIG. 9B depicts an embodiment of a computer 900 in which the CPU 905 communicates directly with I/O device 935E. FIG. 9B also depicts an embodiment in which local buses and direct communication are mixed: the CPU 905 communicates with I/O device 935D using a local system bus 955 while communicating with I/O device 935E directly.

A wide variety of I/O devices 535 may be present in the computing device 900. Input devices include one or more keyboards 935B, mice, trackpads, trackballs, microphones, and drawing tables, to name a few non-limiting examples. Output devices include video display devices 935A, speakers and printers. An I/O controller 930 as shown in FIG. 9A, may control the one or more I/O devices, such as a keyboard 935B and a pointing device 935C (e.g., a mouse or optical pen), for example.

Referring again to FIG. 9A, the computing device 900 may support one or more removable media interfaces 520, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 535 may be a bridge between the system bus 955 and a removable media interface 920.

The removable media interface 920 may, for example, be used for installing software and programs. The computing device 900 may further include a storage device 915, such as one or more hard disk drives or hard disk drive arrays, for storing an operating system and other related software, and for storing application software programs. Optionally, a removable media interface 920 may also be used as the storage device. For example, the operating system and the software may be run from a bootable medium, for example, a bootable CD.

In an embodiment, the computing device 900 may include or be connected to multiple display devices 935A, which each may be of the same or different type and/or form. As such, any of the I/O devices 535 and/or the I/O controller 930 may include any type and/or form of suitable hardware, software, or combination of hardware and software to support, enable or provide for the connection to, and use of, multiple display devices 935A by the computing device 900. For example, the computing device 900 may include any type and/or form of video adapter, video card, driver, and/or library to interface, communicate, connect or otherwise use the display devices 935A. In an embodiment, a video adapter may include multiple connectors to interface to multiple display devices 935A. In another embodiment, the computing device 900 may include multiple video adapters, with each video adapter connected to one or more of the display devices 935A. In other embodiments, one or more of the display devices 935A may be provided by one or more other computing devices, connected, for example, to the computing device 900 via a network. These embodiments may include any type of software designed and constructed to use the display device of another computing device as a second display device 935A for the computing device 900. One of ordinary skill in the art will recognize and appreciate the various ways and embodiments that a computing device 900 may be configured to have multiple display devices 935A.

An embodiment of a computing device indicated generally in FIGS. 9A and 9B may operate under the control of an operating system, which controls scheduling of tasks and access to system resources. The computing device 900 may be running any operating system, any embedded operating system, any real-time operating system, any open source operation system, any proprietary operating system, any operating systems for mobile computing devices, or any other operating system capable of running on the computing device and performing the operations described herein.

The computing device 900 may be any workstation, desktop computer, laptop or notebook computer, server machine, handled computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 900 may have different processors, operating systems, and input devices consistent with the device.

In other embodiments, the computing device 900 is a mobile device. Examples might include a Java-enabled cellular telephone or personal digital assistant (PDA), a smart phone, a digital audio player, or a portable media player. In an embodiment, the computing device 900 includes a combination of devices, such as a mobile phone combined with a digital audio player or portable media player.

A computing device 900 may be one of a plurality of machines connected by a network, or it may include a plurality of machines so connected. A network environment may include one or more local machine(s), client(s), client node(s), client machine(s), client computer(s), client device(s), endpoint(s), or endpoint node(s) in communication with one or more remote machines (which may also be generally referred to as server machines or remote machines) via one or more networks. In an embodiment, a local machine has the capacity to function as both a client node seeking access to resources provided by a server machine and as a server machine providing access to hosted resources for other clients. The network may be LAN or WAN links, broadband connections, wireless connections, or a combination of any or all of the above. Connections may be established using a variety of communication protocols. In one embodiment, the computing device 900 communicates with other computing devices 900 via any type and/or form of gateway or tunneling protocol such as Secure Socket Layer (SSL) or Transport Layer Security (TLS). The network interface may include a built-in network adapter, such as a network interface card, suitable for interfacing the computing device to any type of network capable of communication and performing the operations described herein. An I/O device may be a bridge between the system bus and an external communication bus.

In an embodiment, a network environment may be a virtual network environment where the various components of the network are virtualized. For example, the various machines may be virtual machines implemented as a software-based computer running on a physical machine. The virtual machines may share the same operating system. In other embodiments, different operating system may be run on each virtual machine instance. In an embodiment, a "hypervisor" type of virtualizing is implemented where multiple virtual machines run on the same host physical machine, each acting as if it has its own dedicated box. The virtual machines may also run on different host physical machines.

Other types of virtualization are also contemplated, such as, for example, the network (e.g., via Software Defined Networking (SDN)). Functions, such as functions of session border controller and other types of functions, may also be virtualized, such as, for example, via Network Functions Virtualization (NFV).

According to one or more disclosed embodiments, various operations described above may be omitted, or additional operations may be included, unless otherwise indicated, without departing from the spirit and scope of the disclosed embodiments. Additionally, the order of the operations may be modified or changed, unless otherwise stated or implied, without departing from the spirit and scope of the disclosed embodiments.

Many of the functional units of the system in embodiments of the invention may be implemented as code routines in computerized telephony equipment, computer servers, and individual workstations. It is well-known that programmers are highly individualistic, and may implement similar functionality by considerably different routines. Also, the invention may be applied to widely varying hardware systems. Further, hardware used to practice the invention may vary in many ways. There are similarly many other alterations in the embodiments described herein which will fall within the spirit and scope of the disclosed embodiments in its several aspects described. The invention is limited only by the breadth of the claims below.

The invention claimed is:

1. A method of transmitting an interactive audiovisual asynchronous query in a contact center system, the method comprising:
providing, by a web server, an editable audiovisual interface to a web-enabled user device associated with a first party;
recording, by the web server, an interaction of the first party with the editable audiovisual interface;
generating, by the web server, an asynchronous query for the contact center system from the recorded interaction;
processing, by an audiovisual analysis system, at least one of the audio and the video of the asynchronous query;
determining, by the audiovisual analysis system, an intent generated from the processed video;
transmitting, by the audiovisual analysis system, the determined intent and the asynchronous query to a routing server; and
transmitting, by the routing server, a signal for routing the asynchronous query to a second party wherein the determined intent is used to determine the second party recipient of the asynchronous query;
wherein the second party responds to the recorded interaction though the editable audiovisual interface, the responding by the second party comprising:
providing, by a web server, an editable audiovisual interface to the second party;
recording, by the web server, the second party interaction with the editable audiovisual interface;
recording, by the audiovisual analysis system, the second party interaction for preservation by the contact center; and
transmitting, by the audiovisual analysis system, the second party interaction to the first party through the asynchronous channel.

2. The method of claim 1, wherein the editable audiovisual interface comprises tools to enable the first party to perform over a web page of the user device one or more of: draw, point, write text, and input speech.

3. The method of claim 1, wherein the processing, further comprises determining an action performed during the asynchronous query by the first party.

4. The method of claim 1, wherein the processing further comprises determining an object engaged on a web page of the user device during the asynchronous query.

5. The method of claim 1, wherein the processing further comprises determining portions of audio needing stitched to corresponding video of the asynchronous query.

6. The method of claim 1, wherein the second party comprises a virtual agent.

7. The method of claim 1, wherein the intent comprises routing parameters, wherein the routing parameters comprise at least one of: customer type, webpage type, intent type, user intent, keyword, mood, priority, and emotion.

8. A method of transmitting an interactive audiovisual asynchronous query in a contact center system, the method comprising:
providing, by a web server, an editable audiovisual interface to a web-enabled user device associated with a first party;
recording, by the web server, an interaction of the first party with the editable audiovisual interface;
generating, by the web server, an asynchronous query for the contact center system from the recorded interaction;
processing, by an audiovisual analysis system, at least one of the audio and the video of the asynchronous query;
determining, by the audiovisual analysis system, an intent generated from the processed video;
transmitting, by the audiovisual analysis system, the determined intent and the asynchronous query to a routing server; and
transmitting, by the routing server, a signal for routing the asynchronous query to a second party wherein the determined intent is used to determine the second party recipient of the asynchronous query;
wherein the determining of intent comprises:
determining, by the audiovisual analysis system, frames in the asynchronous query indicating an action performed by the first party in video of the query;
generating, by the audiovisual analysis system, a plurality of audiovisual clips from the query, dividing the query from the determined frames indicating action performed by the first party;
processing, by the audiovisual analysis system, one of the generated audiovisual clips, wherein the processing comprises using an action recognition application for determining an action performed during the generated audiovisual clip;
processing, by the audiovisual analysis system, the generated audiovisual clip through an entity recognition application for determining an interacted entity during the generated audiovisual clip;
processing, by the audiovisual analysis system, the audio of the query that requires stitching to corresponding action identified from audiovisual clips;
processing, by the audiovisual analysis system, the generated audiovisual clip through a speech recognition application for deriving content of speech from the generated audiovisual clip;
generating, by the audiovisual analysis system, an audiovisual clip output comprised of determined action, interacted entity, and derived speech content from the processed generated audiovisual clip; and
determining, by the audiovisual analysis system, a first party intent from the generated audiovisual clip output.

9. The method of claim 8, wherein the action performed during the generated audiovisual clip is a drawing by the first party in the video of the query.

10. The method of claim 8, wherein the action performed during the generated audiovisual clip is a typed text by the first party in the video of the query.

11. The method of claim 8, wherein the interacted entity is a web browser object in a web browser window.

12. The method of claim 8, wherein the first party intent is expressed as a JSON object.

13. The method of claim 8, further comprising responding to the first party, wherein the responding comprises an asynchronous automated response.

14. The method of claim 13, wherein the responding to the first party via the asynchronous automated response further comprises the steps of:
providing, by a web server, an editable audiovisual interface to the first party;
providing, by the web server, an interaction point for the first party;
providing, by the web server, a recommendation window in response to the first party interacting with the interaction point;
receiving, by the web server, a signal indicating a selection by the first party from the recommendation window;

determining, by a recommendation engine, whether an asynchronous automated response exists for the selection by the first party from the recommendation window; and transmitting, by the web server, to the first party the asynchronous automated response if the asynchronous automated response exists for the selection by the first part from the recommendation window, otherwise, routing the interaction to a second party for handling.

15. The method of claim 14, wherein the interaction point is associated with a web browser object shown on the web-enabled end user device.

16. The method of claim 14, wherein the recommendation engine generates the selection from the recommendation window from a database of intents and entity classification generated from other queries.

* * * * *